(12) United States Patent
Xiao et al.

(10) Patent No.: US 11,199,890 B2
(45) Date of Patent: *Dec. 14, 2021

(54) PERIPHERAL DEVICE EXPANSION CARD SYSTEM

(71) Applicant: Dell Products L.P., Round Rock, TX (US)

(72) Inventors: Yimin Xiao, Austin, TX (US); Terry L. Matula, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 315 days.

This patent is subject to a terminal disclaimer.

(21) Appl. No.: 16/426,136

(22) Filed: May 30, 2019

(65) Prior Publication Data

US 2019/0278350 A1    Sep. 12, 2019

Related U.S. Application Data

(63) Continuation of application No. 15/677,828, filed on Aug. 15, 2017, now Pat. No. 10,317,973.

(51) Int. Cl.
*G06F 1/26* (2006.01)
*G06F 13/10* (2006.01)
*G06F 1/3234* (2019.01)
*G06F 1/18* (2006.01)
*G06F 1/3287* (2019.01)
(Continued)

(52) U.S. Cl.
CPC .............. *G06F 1/266* (2013.01); *G06F 1/189* (2013.01); *G06F 1/325* (2013.01); *G06F 1/3215* (2013.01);
(Continued)

(58) Field of Classification Search
CPC ..................................................... G06F 1/3281
See application file for complete search history.

(56) References Cited

U.S. PATENT DOCUMENTS

| 8,674,679 B2 | 3/2014 | Zhong et al. |
| 9,787,085 B2 | 10/2017 | Barnette et al. |
| 2014/0089704 A1* | 3/2014 | de Santiago Dom nguez ............. G06F 1/3284 713/323 |

(Continued)

OTHER PUBLICATIONS

"ASRock—Thunderbolt 2 AIC, Thunderbolt™ 2 AIC: Easy Access To The Fastest Thunderbolt™ Connection", 2002-2016, ASRock Inc., 2 Pages, http://www.asrock.com/mb/spec/card.asp?Model=Thunderbolt%202%20AIC.
"ThunderboltEX 3—Motherboard Accessories—ASUS USA, Experience Blistering Thunderbolt 3 Speeds And Any-Way-Up Connectivity," 3 Pages, https://www.asus.com/us/Motherboard-Accessory/ThunderboltEX-3/.
(Continued)

*Primary Examiner* — Albert Wang
(74) *Attorney, Agent, or Firm* — Joseph Mencher

(57) ABSTRACT

A computing system includes a system board having a system controller device with an interrupt input. A system expansion bus connector is located on the system board and includes power pin(s) and an interrupt signal pin connected to the interrupt input. A peripheral device expansion card system is coupled to the computing system through system expansion bus connector and includes a system power reporting device coupled to the power pin(s) to receive power from the computing system via the power pin(s), and a card controller device coupled to the system power reporting device and to the interrupt signal pin. The card controller device determines, using the system power reporting device, a power state of the computing system. The card controller device also sends, to the system controller device through
(Continued)

the interrupt signal pin, an interrupt signal that the system controller device interprets as a hot plug event.

20 Claims, 8 Drawing Sheets

(51) Int. Cl.
    *G06F 13/40*          (2006.01)
    *G06F 13/24*          (2006.01)
    *G06F 1/3215*        (2019.01)

(52) U.S. Cl.
    CPC .......... *G06F 1/3281* (2013.01); *G06F 1/3287* (2013.01); *G06F 13/10* (2013.01); *G06F 13/24* (2013.01); *G06F 13/4022* (2013.01)

(56) References Cited

U.S. PATENT DOCUMENTS

2018/0088658 A1*   3/2018   McFarlane ............ G06F 1/3275
2019/0056773 A1    2/2019   Xiao et al.

OTHER PUBLICATIONS

"GC—Alpine Ridge (rev. 1.0)—Motherboard—GIGABYTE, GC—Alpine Ridge (rev. 10)," 2017, GIGA-BYTE Technology Co., Ltd., 5 Pages, http://www.gigabyte.com/Motherboard/GC-ALPINE-RIDGE-rev-10#ov.

"GC—Thunderbolt 2 (rev. 1.0)—Motherboard—GIGABYTE, GC—Thunderbolt 2 (rev. 1.0)," 2017, GIGA-BYTE Technology Co., Ltd., 6 Pages, http://www.gigabyte.com/Motherboard/GC-Thunderbolt-2-rev-10#ov.

"Dell Precision Tower 5810/7810/7910/1700MT/1700SFF/3620MT And Rack 7910, Thunderbolt Add-In-Cards Setup Guide, Setting Up The Thunderbolt Add-In-Card," 3 Pages, http://www.dell.com/support/manuals/us/en/04/precision-t5810-workstation/Setting_Thunderbolt_PCIe%20Card_pub-v1/Setting-up-the-Thunderbolt-Add-In-Card?guid=GUID-B2E05CA8-34E2-485F-AEE2-58B5097C56F5&lang=en-us.

"Sweetwater Custom Computing Thunderbolt Option Card For Creation Station 450v5, Sweetwater Custom Computing Thunderbolt Option Card For Creation Station 450v5 Demo," 2017, Sweetwater, 2 Pages, https://www.sweetwater.com/store/detail/TBEX3Optd.

http://h20564.www2.hp.com/hpsc/doc/public/display?docId=emr_na-c04283970.

* cited by examiner

PERIPHERAL DEVICE EXPANSION CARD SYSTEM

CROSS-REFERENCE TO RELATED APPLICATIONS

This is a Continuation application to U.S. Utility application Ser. No. 15/677,828 filed Aug. 15, 2017, entitled "Peripheral Device Expansion Card System,", the disclosure of which is incorporated herein by reference in its entirety.

BACKGROUND

The present disclosure relates generally to information handling systems, and more particularly to providing a peripheral device expansion card as part of an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems may be provided with peripheral device expansion cards in order to allow peripheral devices to be connected to the information handling system. For example, the THUNDERBOLT® hardware interface developed by APPLE® Inc. of Cupertino, Calif., United States, and INTEL® Corporation of Santa Clara, Calif., United States, allows for the connection of peripheral devices to information handling systems such as desktop computing systems, laptop/notebook computing systems, and/or a variety of other computing systems known in the art, and expansion cards have been developed to enable or expand the use of THUNDERBOLT® hardware interface technology on such computing systems. However, many conventional peripheral device expansion cards require, in additional to the connection of the peripheral device expansion card to a peripheral device connector on the motherboard, the use of a sideband cable that connects to controllers on the peripheral device expansion card and the motherboard in order to enable the functionality provided by the peripheral device expansion card.

To provide a specific example related to the THUNDERBOLT® hardware interface discussed above, conventional THUNDERBOLT® peripheral device expansion cards require a connection to a Peripheral Component Interconnect express (PCIe) connector on a motherboard of the computing system, as well as the use of a sideband cable may connect to both a controller on the conventional THUNDERBOLT® peripheral device expansion card (e.g., a THUNDERBOLT chipset) and to a motherboard connector (e.g., a THUNDERBOLT® "header") that is coupled to a processing system on the motherboard, in order to enable THUNDERBOLT® hardware interface functionality for devices coupled to peripheral device connectors (e.g., DisplayPort connections and/or Universal Serial Bus (USB) type-C connectors) provided on the conventional THUNDERBOLT® peripheral device expansion card. The need to utilize such sideband cables increases the cost and complexity of enabling or expanding the use of THUNDERBOLT® hardware interface technology on a computing system, and is subject to user errors such as, for example, neglecting to utilize the sideband cable (i.e., because the user is unaware that a sideband cable is required, as such requirements are outside the norm of most expansion cards), or damage that can occur from attempting to connect the sideband cable to the wrong type of connector. Furthermore, the current implementation of sideband cables with conventional THUNDERBOLT® peripheral device expansion cards has dictated the provisioning of a single THUNDERBOLT® header on the motherboard of conventional computing systems, which has effectively limited the number of THUNDERBOLT® peripheral device expansion cards that may be used with such computing systems to one, thus limiting the number of peripheral devices that may be coupled to those computing systems.

Accordingly, it would be desirable to provide an improved peripheral device expansion card system.

SUMMARY

According to one embodiment, a peripheral device expansion card system includes a card base; a card expansion bus connector that is located on the card base, that is configured to couple to a system board, and that includes: at least one power pin; and an interrupt signal pin; a system power reporting device that is located on the card base, coupled to the at least one power pin, and configured to receive power via the at least one power pin; and a card controller device that is coupled to the system power reporting device and to the interrupt signal pin, wherein the card controller device is configured to: determine, using the system power reporting device, a power state of a computing system that includes the system board; and send, through the interrupt signal pin, a interrupt signal that is configured to signify a hot plug event.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
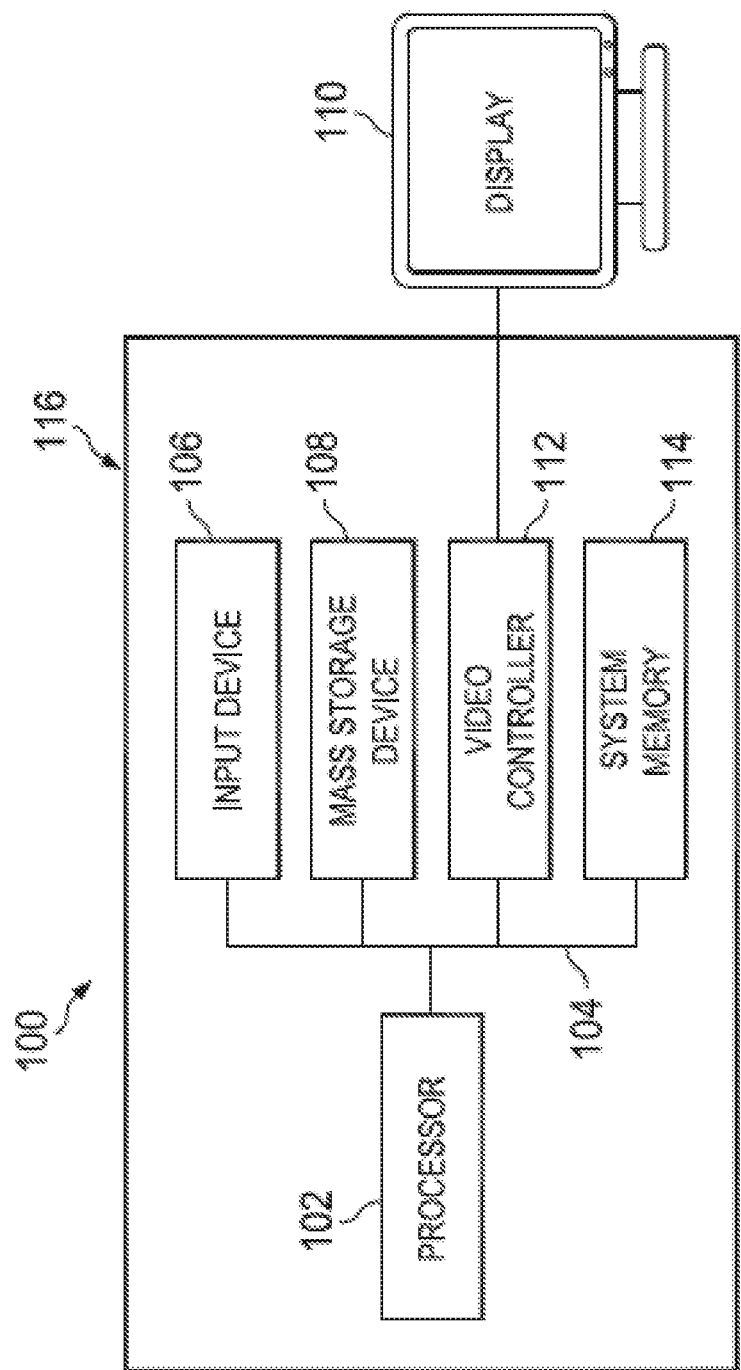
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
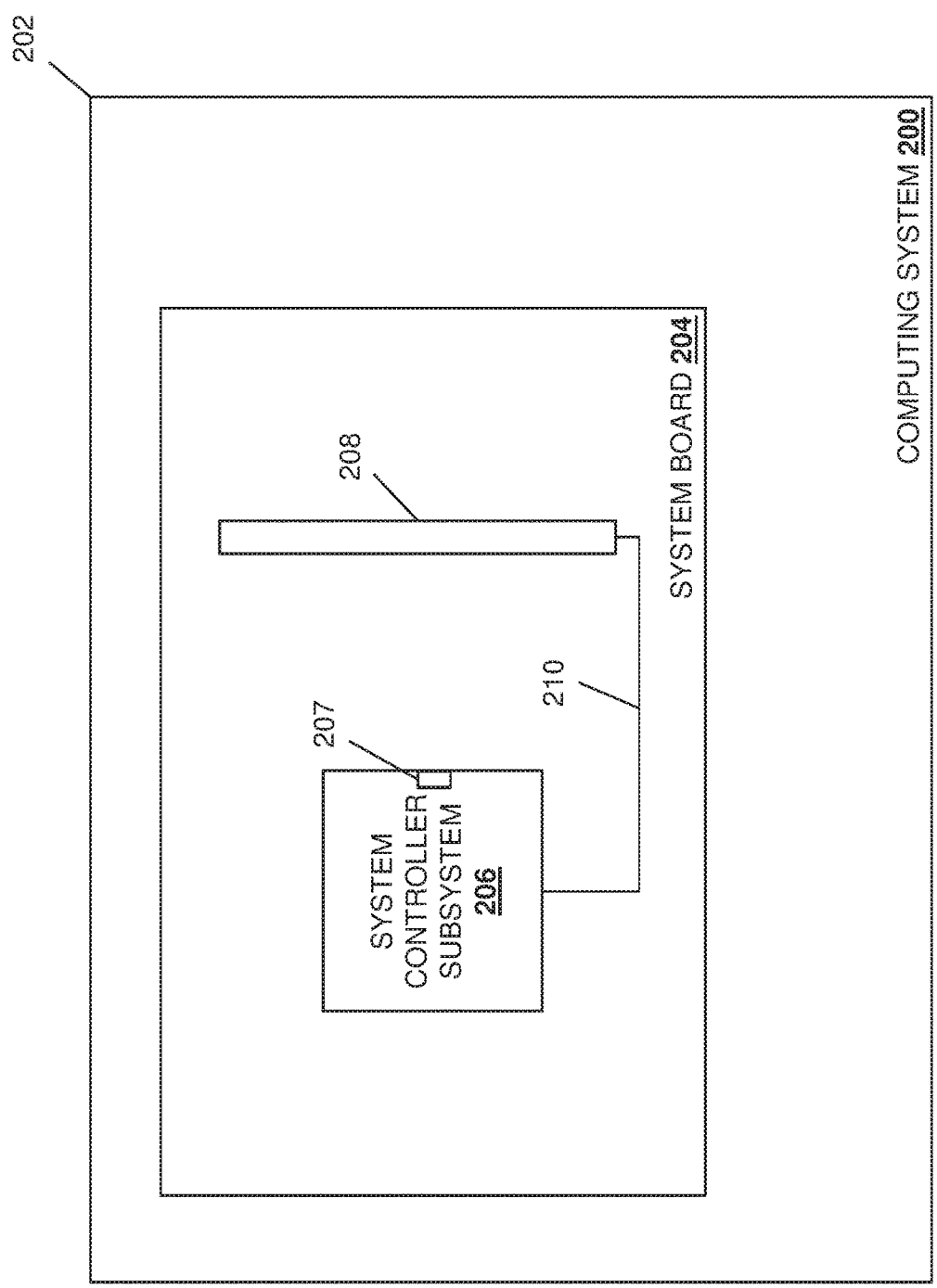
FIG. 2 is a schematic view illustrating an embodiment of a computing system.

Referring now to FIG. 2, an embodiment of a computing system 200 is illustrated. In some embodiments, the computing system 200 may be the IHS 100 discussed above with reference to FIG. 1, and/or may include some or all of the components of the IHS 100. While the examples below describe the computing system as a desktop computing system or a laptop/notebook computing system, a variety of other types of computing systems including server computing systems, networking computing systems, and storage systems may benefit from the teachings of the present disclosure and thus are envisioned as falling within its scope as well. In the illustrated embodiment, the computing system 200 includes a chassis 202 that houses the components of the computing system 200, only some of which are illustrated in FIG. 2. For example, the chassis 202 may house a system board 204 that may be, for example, a motherboard, although other boards may fall within the scope of the present disclosure as well. The chassis 202 may also house a board controller subsystem 206 that, in the illustrated embodiment, is located on the system board 204. In an embodiment, the board controller subsystem 206 may be provided by a processing system (e.g., a Central Processing Unit (CPU) and/or other processing systems that utilize processors similar to the processor 102 discussed above with reference to FIG. 1), a controller hub (e.g., a Platform Controller Hub (PCH)), and/or may utilize a variety of other board controller components known in the art. As such, the chassis 202 may house a memory system (not illustrated, but which may include the system memory 114 discussed above with reference to FIG. 1) that is coupled to the processing system or controller hub and that includes instructions that, when executed by the processing system or controller hub, provide for the functionality of the board controller subsystem 206 discussed below. In the illustrated embodiment, the board controller subsystem 206 includes a controller external connector 207

The chassis 202 may also house a system expansion bus connector 208 that, in the illustrated embodiment, is located on the system board 204. In the examples discusses below, the system expansion bus connector 208 is described as a Peripheral Component Interconnect express (PCIe) expansion bus connector, other types of expansion bus connectors will fall within the scope of the present disclosure as well. The board controller subsystem 206 and the system expansion board connector 208 are coupled together by a system expansion bus 210 that may be provided by, for example, a plurality of traces that extend through the system board 204 between the board controller subsystem 206 and the system expansion board connector 208, although other types of system expansion buses will fall within the scope of the present disclosure as well. While only one system expansion bus connector 208 is illustrated on the system board 204, one of skill in the art in possession of the present disclosure will recognize that system boards in computing systems may (and typically will) include several system expansion board connectors, any of which may be connected to the system expansion bus 210 similarly as described herein with the system expansion bus connector 208. While a specific computing system 200 has been described, one of skill in the art in possession of the present disclosure will recognize that computing devices may include a variety of other component in a variety of configuration in order to provide conventional computing system functionality, as well as the functionality described below, while remaining within the scope of the present disclosure.

Figure 3A:
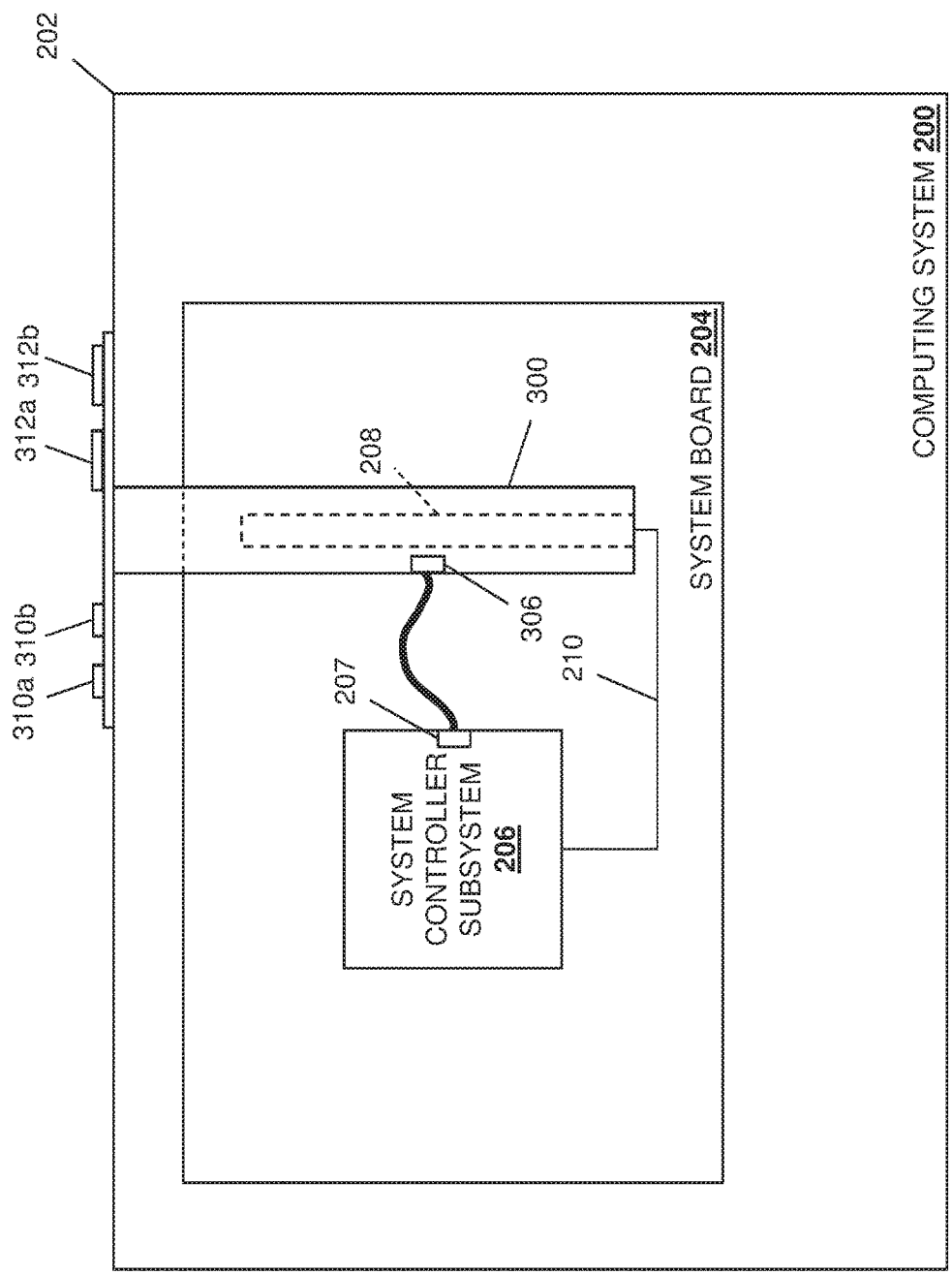
FIG. 3A is a schematic view illustrating an embodiment of a conventional peripheral device expansion card system connected to the computing system of FIG. 2.
Figure 3B:
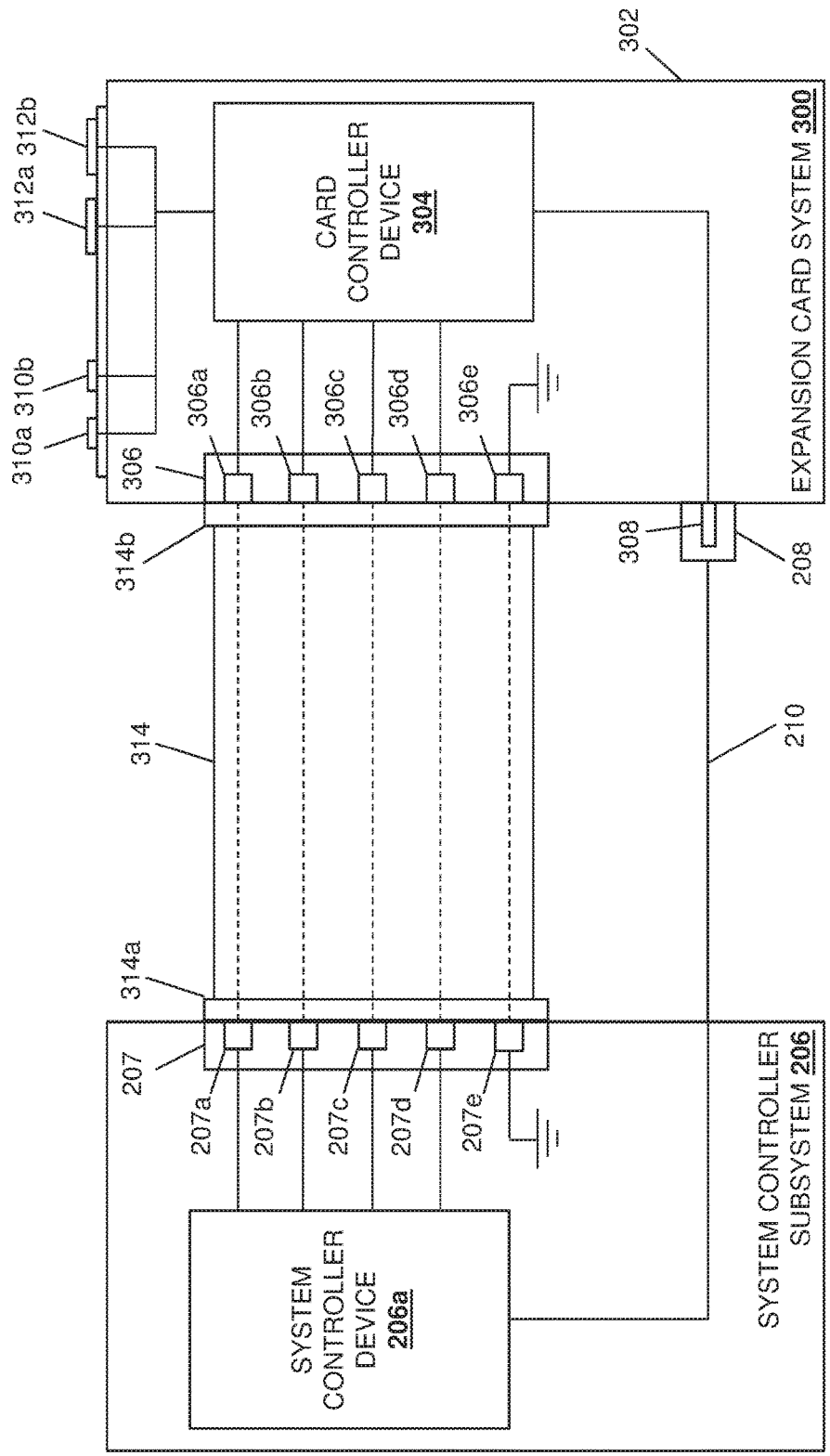
FIG. 3B is a schematic view illustrating an embodiment of the conventional peripheral device expansion card system of FIG. 3A connected to the computing system of FIG. 2.

Referring now to FIGS. 2, 3A, and 3B, an embodiment of a conventional peripheral device expansion card system 300 connected to the system expansion bus connector 206 on the system board 204 of the computing system 200 is illustrated in order to illustrate the advances provided by the teachings of the present disclosure. In the illustrated embodiment, the board controller subsystem 206 includes a system controller device 206a (e.g., the CPU, PCH, and/or other board controller component(s) discussed above) that is coupled to the system expansion bus 210, as well as to the controller external connector 207. In a specific example in which the board controller subsystem 206 is configured to connect to a conventional THUNDERBOLT® peripheral expansion card system, the system controller device 206a is connected to a "force power" pin 207a that is located on or coupled to the controller external connector 207, a "system S3" pin 207b that is located on or coupled to the controller external connector 207, a "system S5" pin 207c that is located on or coupled to the controller external connector 207, and a "hot plug event" pin 207d that is located on or coupled to the controller external connector 207, with a ground pin 207e that is located on or coupled to the controller external connector 207 connected to ground.

In the illustrated embodiment, the conventional peripheral device expansion card subsystem 300 includes a card base 302 that may house (or provide a mounting structure for) the components of the conventional peripheral device expansion card system 300. For example, the card base 302 may be a circuit board, although other card base materials and/or structures may fall within the scope of the present disclosure as well. In the illustrated embodiment, a card controller device 304 is located on the card base 302, and may be provided by a processing system (e.g., a chipset). In a specific example in which the conventional peripheral device expansion card system 300 is a conventional THUNDERBOLT® peripheral expansion card system, the card controller device 304 may be a THUNDERBOLT® chipset, although other processing systems and/or controllers will fall within the scope of the present disclosure as well. The card controller device 304 is coupled to a card external connector 306 that is located on the card base 302. In a specific example in which the conventional peripheral device expansion card system 300 is a conventional THUNDERBOLT® peripheral expansion card system, the card controller device 304 is connected to a "force power" pin 306a that is located on or coupled to the card external connector 306, a "system S3" pin 306b that is located on or coupled to the card external connector 306, a "system S5" pin 306c that is located on or coupled to the card external connector 306, and a "hot plug event" pin 306d that is located on or coupled to the card external connector 306, with a ground pin 306e that is located on or coupled to the card external connector 306 connected to ground.

The card controller device 304 is also coupled to a card expansion bus connector 308 that is illustrated as mating with the system expansion bus connector 208. As such, the card expansion bus connector 308 may be a PCIe expansion bus connector, although other expansion bus connectors will fall within the scope of the present disclosure as well. In the illustrated embodiment, a plurality of peripheral device connectors 310a, 310b, 312a, and 312b are coupled to the card base 302 and to the card controller device 304. In a specific example in which the conventional peripheral device expansion card system 300 is a conventional THUNDERBOLT® peripheral expansion card system, the peripheral device connectors 310a and 310b may be USB Type-C connectors, and the peripheral device connectors 312a and 312b may be DisplayPort connectors, although other peripheral device connectors will fall within the scope of the present disclosure as well.

The conventional peripheral device expansion card system 300 is illustrated as coupled to the board controller subsystem 206 via a connection to the system expansion bus 210 that is provided by the mating of the card expansion bus connector 308 with the system expansion bus connector 208, and via a sideband cable 314 that is connected to each of the controller external connector 207 via a first sideband cable connector 314a, and the card external connector 306 via a second sideband cable connector 314b. In a specific example in which the conventional peripheral device expansion card system 300 is a conventional THUNDERBOLT® peripheral expansion card system, the sideband cable 314 operates to coupled the "force power" pins 207a and 306a, the "system S3" pin 207b and 306b, the "system S5" pins 207c and 306c, the "hot plug event" pins 207d and 306d, and the ground pins 207e and 306e, as illustrated. In some examples, computing systems and conventional THUNDERBOLT® peripheral device expansion card systems may operate to multiplex PCIe and DisplayPort signals for transmission over 2 duplex THUNDERBOLT® lanes provided in the sideband cable 314, and the de-multiplex those signals subsequent to transmission for use by PCIe and DisplayPort peripheral devices. However, other sideband cables that couple together other types of pins will fall within the scope of the present disclosure as well.

One of skill in the art in possession of the present disclosure will recognize that the conventional THUNDERBOLT® peripheral device expansion card system discussed above leverages a PCIe expansion bus (i.e., the system expansion bus 210) to communicate with the controller hub (i.e., the system controller device 206a), but does not fully follow the PCIe specification in doing so. For example, when handling hot plug events (e.g., when a peripheral device is connected to one of the peripheral device connectors 310a, 310b, 312a, and 312b), conventional THUNDERBOLT® peripheral expansion card systems do not utilize conventional hot plug event message packets sent over the PCIe bus. Rather, conventional THUNDERBOLT® peripheral expansion card systems utilize an out-of-band Non-Maskable Interrupt (NMI) signal that is sent over the sideband cable 314 (i.e., via the "hot plug event" pins 207d and 306d) and that is configured to cause the controller hub (i.e., the system controller device 206a) to trigger a full PCIe rescan to refresh the THUNDERBOLT® topology. Furthermore, the sideband cable 314 may also be utilized to transmit power state signals (i.e., via the "system S3" pins 207b and 306b, and via the "system S5" pins 207c and 306c) so that the THUNDERBOLT® chipset (i.e., the card controller device 304) is aware of the power state of the computing system 200 (e.g., an S3 sleep power state or an S5 powered off power state). Finally, the sideband cable 314 may also be utilized to provide the conventional THUNDERBOLT® peripheral expansion card systems in a debugging operational state by transmitting a "force power" signal (i.e., via the "force power" pins 207a and 306a) that causes the conventional THUNDERBOLT® peripheral expansion card system to utilize auxiliary power to remain powered even when disconnected from the computing system 200 (e.g., for debugging purposes.)

While a specific example of a conventional peripheral expansion card system has been provided, one of skill in the art in possession of the present disclosure will recognize that other systems that utilize other types of conventional peripheral expansion card systems may benefit from the teachings of the present disclosure and thus will fall within its scope as well. For example, the TERA2240 Host Card (available from Leadtek Research Inc. of New Taipei, Taiwan) provides a Teradici workstation remote control PCIe add-in card that includes a sideband cable to enable power button functionality, and one of skill in the art in possession of the present disclosure will recognize how such a system would benefit from the teachings of the present disclosure as well.

Figure 4:
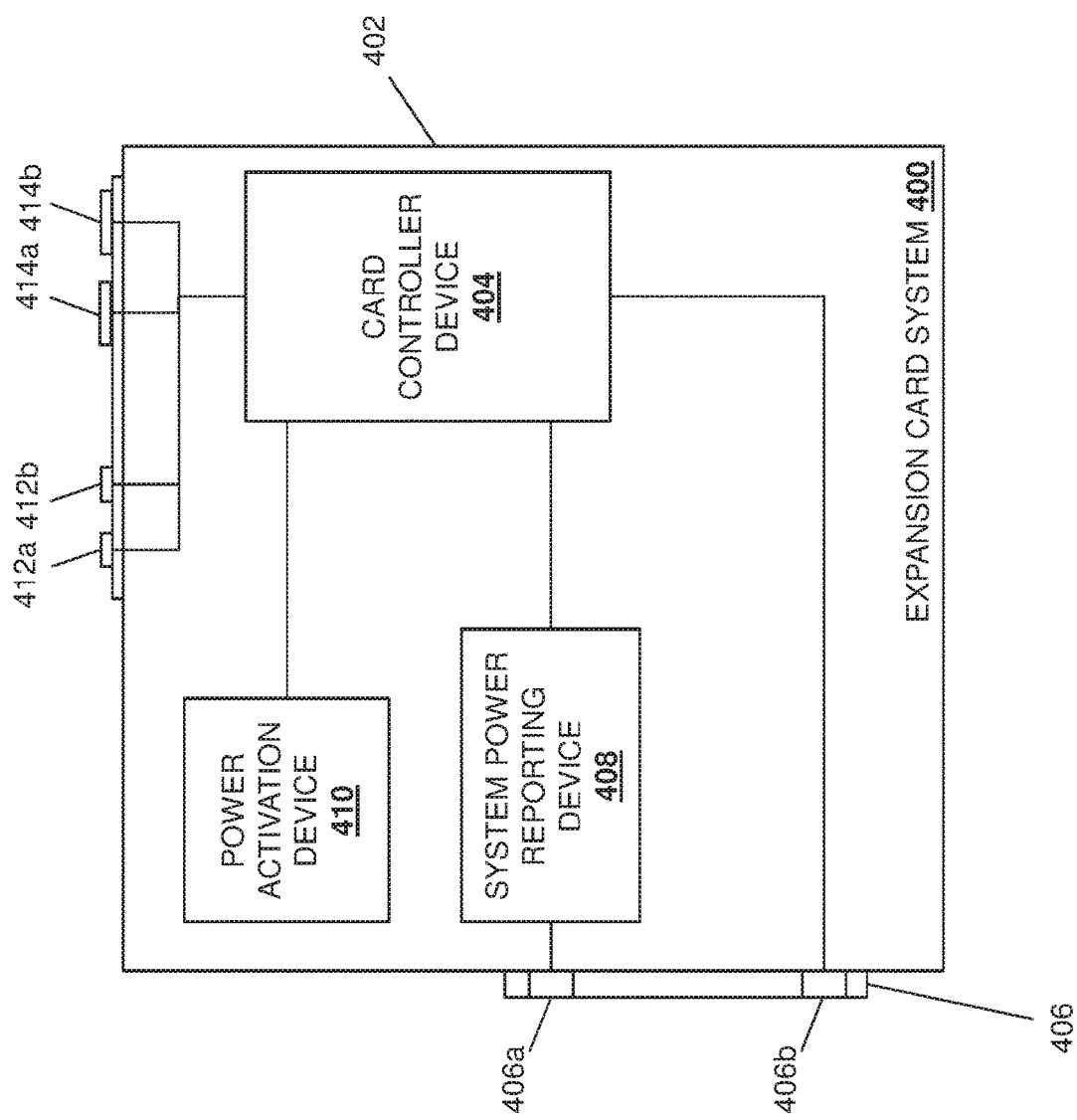
FIG. 4 is a schematic view illustrating an embodiment of a peripheral device expansion card system.

Referring now to FIG. 4, an embodiment of a peripheral expansion card system 400 is illustrated. In the illustrated embodiment, the peripheral expansion card system 400 includes a card base 402 that may house (or provide a mounting structure for) the components of the peripheral device expansion card system 400. For example, the card base 402 may be a circuit board, although other card base materials and/or structures may fall within the scope of the present disclosure as well. In the illustrated embodiment, a card controller device 404 is located on the card base 402, and may be provided by a processing system (e.g., a chipset). In a specific example in which the peripheral device expansion card system 400 is provided to enable THUNDERBOLT® hardware interface technology, the card controller device 404 may be a THUNDERBOLT® chipset, although other processing systems and/or controllers will fall within the scope of the present disclosure as well. The card controller device 404 is coupled to a card expansion bus connector 406 that may be, for example, a PCIe expansion bus connector, although other expansion bus connectors will fall within the scope of the present disclosure as well. In the specific example illustrated in FIG. 4, the card controller device 404 is coupled to at least one power pin 406a on the card expansion bus connector 406 via a system power reporting device 408. In the examples below, the system power reporting device 408 is described as a voltage divider device that is coupled to the at least one power pin 406a (e.g., a 12 volt power pin) and that is configured to convert a first power amount received through the at least one power pin 406a to a second power amount that is less than the first power amount, and provide that second power amount to the card controller device 404 (e.g., using a passive linear circuit that includes two resistors in series, with an input voltage (i.e., the first power amount) applied across the resistors and an output voltage (i.e., the second power amount) emerging from the connection between the resisters). However, one of skill in the art in possession of the present disclosure will recognize that other types of system power reporting devices may be utilized by the card controller device 404 to provide the same functionality as the voltage divider device discussed below while remaining within the scope of the present disclosure.

In the specific example illustrated in FIG. 4, the card controller device 404 is also coupled to an interrupt signal pin 406b on the card expansion bus connector 406. In the examples below, the interrupt signal pin 406b is described as a previously reserved pin on a PCIe expansion bus connector (e.g., as per the PCIe specification) that is utilized by the peripheral device expansion card system 400 to transmit interrupt signals. For example, at the time of the drafting of the present application, the PCIe specification lists the B12 pin on 1-lane PCIe connectors as reserved/not used; the B12, B30, A19, and A32 pins on 4-lane PCIe connectors as reserved/not used; the B12, B30, A19, A32, and A33 pins on 8-lane PCIe connectors as reserved/not used; and the B12, B30, B82, A19, A32, A33, and A50 pins on 16-lane PCIe connectors as unused. As such, in different embodiments, the interrupt signal pin 406b may be provided on a PCIe expansion bus connector using one of the reserved/not used pins listed above.

In the specific example illustrated in FIG. 4, the card controller device 404 is also coupled to a power activation device 410 that is located on the card base 402. In the examples below, the power activation device 410 is described as a force power jumper device that is configured to be activated to cause the card controller device 404 to remain powered (e.g., by utilizing auxiliary power included on or connected to the peripheral device expansion card system 400) when the peripheral device expansion card system 400 is disconnected from the computing system 200 in order to, for example, perform debugging, testing, or other operations. However, one of skill in the art in possession of the present disclosure will recognize that other types of power activation devices that perform similar functionality as that discussed below will fall within the scope of the present disclosure as well. In the illustrated embodiment, a plurality of peripheral device connectors 412a, 412b, 414a, and 414b are coupled to the card base 402 and to the card controller device 404. In a specific example in which the peripheral device expansion card system 400 is provided to enable THUNDERBOLT® hardware interface technology, the peripheral device connectors 412a and 412b may be USB Type-C connectors, and the peripheral device connectors 414a and 414b may be DisplayPort connectors, although other peripheral device connectors will fall within the scope of the present disclosure as well.

As discussed below, the components and component configuration illustrated and described in FIG. 4 may be utilized to enable THUNDERBOLT® hardware interface technology via the connection of the peripheral device expansion card system 400 to a PCIe connector on the computing system 200 and without the need for a sideband cable. While one of skill in the art will recognize that the peripheral device expansion card system 400 described herein enables THUNDERBOLT® 3 hardware interface technology, earlier (e.g., THUNDERBOLT® 2 hardware interface technology) or future versions of THUNDERBOLT® hardware interface technology are envisioned as falling within the scope of the present disclosure as well. Furthermore, as discussed above, other components may be utilized according to the teachings of the present disclosure to eliminate the need for sideband cables utilized by a variety of peripheral device expansion card systems while remaining within the scope of the present disclosure.

In addition, as would be recognized by one of skill in the art in possession of the present disclosure and as discussed below, the specific components/configuration illustrated in FIG. 4 do not provide support for the computing system 200 to inform the peripheral device expansion card system 400 that it has entered the S3 power sleep state (i.e., only the informing of the S5 powered off state is supported.) However, the transmittal of an S3 power sleep state signal (i.e., from the system controller device 206a to the card controller device 404) may be enabled/supported by connecting the card controller device 404 to a power sleep state signal pin on the card expansion bus connector 406 that may be substantially similar to the interrupt signal pin 406b (i.e., the power sleep state signal pin may be a previously reserved pin on a PCIe expansion bus connector (e.g., as per the PCIe specification) that is utilized by the computing system 200 to transmit power sleep state signals, i.e., the one of the B12, B30, B82, A19, A32, A33, and/or A50 pins that is not being used to transmit interrupt signals.) Thus, while only two pins on the card expansion bus connector 406 are illustrated, one of skill in the art in possession of the present disclosure will recognize that the card expansion bus connector 406 includes many more pins (e.g., the pins described for PCIe expansion bus connectors in the PCIe specification.)

Figure 5:
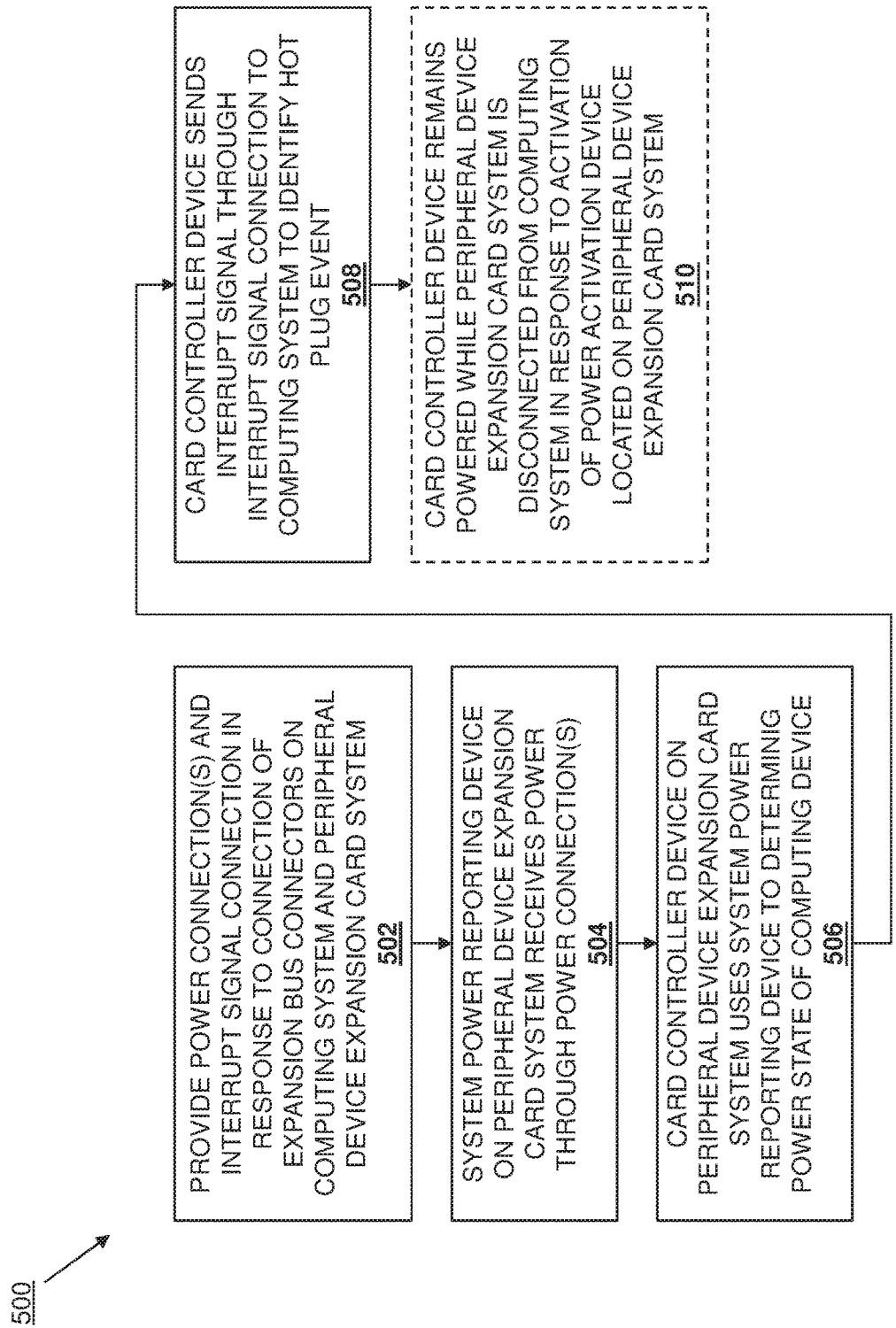
FIG. 5 is a flow chart illustrating an embodiment of a method for providing a peripheral device expansion card system with a computing system.

Referring now to FIG. 5, an embodiment of a method 500 for providing a peripheral device expansion card system with a computing system is illustrated. As discussed below, the systems and methods of the present disclosure provide for the provisioning of peripheral device expansion card systems in computing systems without the need to use a sideband cable that has been traditionally required for those peripheral device expansion card systems. In the examples below, the peripheral device expansion card system provides an embodiment of a THUNDERBOLT® peripheral device expansion card system that may be connected to a computing system using only a PCIe connector and without the need for a sideband cable that has previously been required with conventional THUNDERBOLT® peripheral device expansion cards. That embodiment replaces the functionality provided conventionally using a "force power" signal transmitted over the sideband cable with a power activation device (e.g., a force power jumper device) that is located on the card base and that may be activated (e.g., switched on) to cause the THUNDERBOLT® peripheral expansion card system to utilize auxiliary power to remain powered even when disconnected from the computing system (e.g., for debugging purposes.) That embodiment also replaces the functionality provided conventionally using an S5 power signal transmitted over the sideband cable with a system power reporting device (e.g., a voltage divider device) that is located on the card base and that receives a first power from power pin(s) on the PCIe connector, and provides a second power to the THUNDERBOLT® chipset that is used by the THUNDERBOLT® chipset to determine a power state of the computing system (e.g., an S5 powered off power state). That embodiment also replaces the functionality provided conventionally using a hot plug event signal transmitted over the sideband cable with an interrupt signal that is transmitted over a previously reserved pin on the PCIe connector and that identifies a hot plug event to the computing system. As such, THUNDERBOLT® peripheral device hardware interfaces, as well as other types of expansion card technology, may be enabled without the cost and complexity associated with the use of a sideband cable, and without the possibility of user error that can result from neglecting to connect the sideband cable or attempting to connect the sideband cable to an incompatible connector.

The method 500 begins at block 502 where at least one power connection and an interrupt signal connection are provided in response to connecting a card expansion bus connector on a peripheral device expansion card system to a system expansion bus connector on a computing system. In an embodiment, at block 502, the peripheral device expansion card system 400 discussed above with reference to FIG. 4 is connected to a system controller subsystem 206 on a computing system that is substantially similar to the computing system 200 discussed above with reference to FIG. 2, with the exception that a connection (e.g., a trace or other electrical coupling) has been provided between an interrupt signal pin 208a on the system expansion bus connector 208 and the system controller device 206a. Similarly as discussed above with the interrupt signal pin 406b on the card expansion bus connector 406, the interrupt signal pin 208a on the system expansion bus connector 208 may be provided by the same previously reserved pin on the PCIe expansion bus connectors as the interrupt signal pin 406b (e.g., as per the PCIe specification). As discussed above, at the time of the drafting of the present application, the PCIe specification lists the B12 pin on 1-lane PCIe connectors as reserved/not used; the B12, B30, A19, and A32 pins on 4-lane PCIe connectors as reserved/not used; the B12, B30, A19, A32, and A33 pins on 8-lane PCIe connectors as reserved/not used; and the B12, B30, B82, A19, A32, A33, and A50 pins on 16-lane PCIe connectors as unused. As such, in different embodiments, both of the interrupt signal pins 208a and 406b may be provided on PCIe expansion bus connectors (e.g., the card expansion bus connector 406 and the system expansion bus connector 208) using one of the reserved/not used pins listed above Furthermore, in a specific example, the interrupt signal pin 208a on the system expansion bus connector 208 may be connected to an interrupt input on the system controller device 206a such as, for example, a Non-Maskable Interrupt (NMI)-capable Platform Controller Hub (PCH) General Purpose Input/Output (GPIO) pin provided on the system controller device 206 (although other interrupt inputs are envisioned as falling within the scope of the present disclosure as well.)

Figure 6:
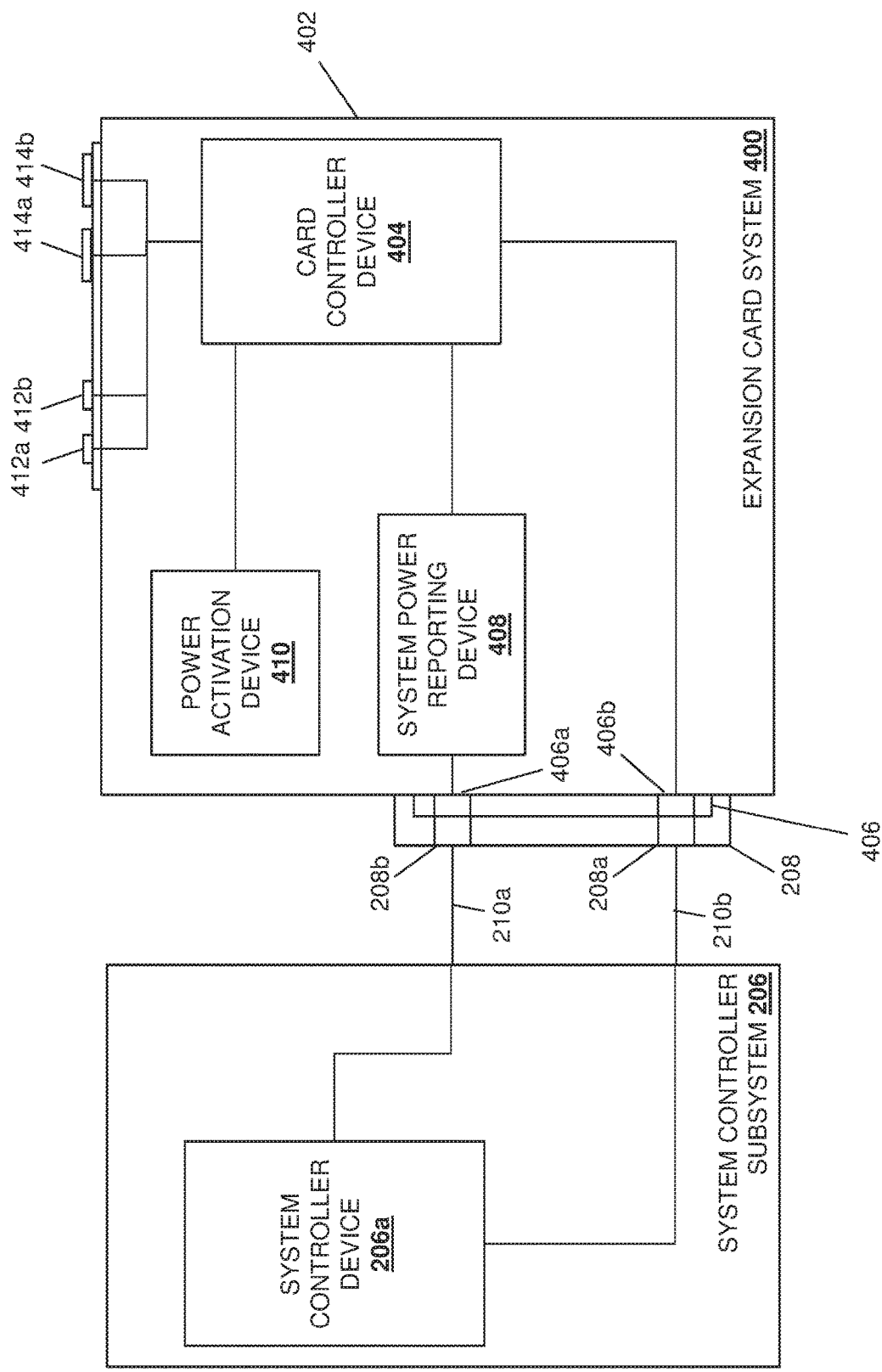
FIG. 6 is a schematic view illustrating an embodiment of the peripheral device expansion card system of FIG. 4 connected to a controller subsystem on the computing system of FIG. 2.

Thus, in an embodiment, the card expansion bus connector 406 (e.g., a first PCIe expansion bus connector) is mated with the system expansion bus connector 208 (e.g., a second PCIe expansion bus connector), which results in the engagement of the at least one power pin 406a on the card expansion bus connector 406 with corresponding power pin(s) 208b on the system expansion bus connector 208 to provide at least one power connection, and the engagement of the interrupt signal pin 406a on the card expansion bus connector 406 with the interrupt signal pin 208a on the system expansion bus connector 208 to provide at least one interrupt signal connection, as illustrated in FIG. 6. While not illustrated or described, one of skill in the art in possession of the present disclosure will recognize that other connections will result from the mating of the card expansion bus connector 406 with the system expansion bus connector 208. For example, one of skill in the art in possession of the present disclosure will recognize that the mating of the card expansion bus connector 406 with the system expansion bus connector 208 may provide a ground connection for the peripheral device expansion card system 400 that is sufficient to eliminate the ground connections provided by the sideband cables as discussed above in FIG. 3B. Furthermore, in addition to providing conventional PCIe connections, the mating of the card expansion bus connector 406 with the system expansion bus connector 208 may result in the engagement of a power sleep state signal pin on the card expansion bus connector 406 (discussed above) with similar a power sleep state signal pin on the system expansion bus connector 208 to provide a power sleep state signal connection.

The method 500 then proceeds to block 504 where power is received through the at least one power connection from the computing system by a system power reporting device located on the peripheral device expansion card system. In an embodiment, at block 504, the system power reporting device receives power from the computing device 200 (e.g., as provided or enabled by the system controller device 206a in the illustrated embodiment) through the at least one power connection provided by the engagement of the at least one power pin 406a on the card expansion bus connector 406 with corresponding power pin(s) 208b on the system expansion bus connector 208. As discussed above, in some examples, the system power reporting device 408 may be a voltage divider device that is configured to receive a first power amount (e.g., 12 volts when the computing system is fully operational) from the computing system 200, convert that first power amount to a second power amount (e.g., 3.3 volts), and provide the second power amount to the card controller device 404. In a specific example, the system power reporting device 408 may be configured to perform a voltage level shifting function that includes using a +12 v power supply received through the motherboard and converting it for use as a +3.3 v logic input for the card controller device 404. However, other types of system power reporting devices that enable the card controller device 404 to determine the power state of the computing system 200 as discussed below will fall within the scope of the present disclosure as well.

The method 500 then proceeds to block 506 where a power state of the computing system is determined using the system power reporting device by a card controller device that is located on the peripheral device expansion card system. In an embodiment, at block 506, the card controller device 404 uses the system power reporting device 408 to determine a power state of the computing system 200. In embodiments where the system power reporting device 408 is provided by a voltage divider device as discussed above, the card controller device 404 may utilize the second power amount provided by the system power reporting device to determine the power state of the computing system 200. For example, the computing device may be configured to provide the voltage divider device 12 volts of power through the at least one power connection when the computing device is fully operational (e.g., in the S0 or G0 operational power state according the Advanced Configuration and Power Interface (ACPI) specification), and the voltage divider device may be configured to convert that 12 volts to 3.3 volts, and provide that 3.3 volts of power to the card controller device 404. As such, at block 506, the card controller device 404 may determine that the computing system is in a fully operational (e.g., S0 or G0) power state in response to receiving 3.3 volts of power from the system power reporting device 408.

In another example, the computing device may be configured to provide the voltage divider device an amount of power that is less than 12 volts (e.g., 0 volts, although other reduced power amounts between 0-12 volts may fall within the scope of the present disclosure as well) through the at least one power connection when the computing device is in a powered off power state (e.g., in the S5 or G2 power state according the Advanced Configuration and Power Interface (ACPI) specification), and the voltage divider device may be configured to convert that reduced power amount to a further reduced power amount that is less than 3.3 voltage and provide that further reduced power amount to the card controller device 404 (or simply provide 0 volts to the card controller device 404 when 0 volts are received from the computing system 200.) As such, at block 506, the card controller device 404 may determine that the computing system is in a powered off (e.g., S5 or G2) power state in response to receiving 0 volts (or some other reduced power amount) of power from the system power reporting device 408. While specific examples have of the determination of the power state of the computing device 200 using a voltage divider device have been provided, one of skill in the art in possession of the present disclosure will recognize that other types of system power reporting devices may be utilized by the card controller device 404 to determine the power state of the computing device 200 using a variety of techniques while remaining within the scope of the present disclosure. Thus, at block 506, the peripheral device expansion card system 400 may enable computing system power state determinations without the use of a sideband cable, as is require in conventional THUNDERBOLT® peripheral device expansion card systems.

The method 500 then proceeds to block 508 where an interrupt signal is sent through the interrupt signal connection by the card controller device to identify a hot plug event. In an embodiment, at block 508, the card controller device 404 may send an interrupt signal to the system controller device 206*a* in the system controller subsystem 206 of the computing system 200 through the interrupt signal connection provided by the engagement of the interrupt signal pin 406*a* on the card expansion bus connector 406 with the interrupt signal pin 208*a* on the system expansion bus connector 208. In a specific example, in response to peripheral device(s) being connected to peripheral device connector(s) 410*a*, 410*b*, 412, and/or 412*b*, the card controller device 404 may identify that connection as a "hot plug" event and, in response, send the interrupt signal through the interrupt connection. In response to receiving that interrupt signal (e.g., via its NMI-capable PCH GPIO pin discussed above), the system controller device 206*a* may then perform a variety of hot plug event actions such as, for example, scanning through a PCIe space and enumerating new PCIe devices when the hot plug event is a PCIe device hot plug event, reconfiguring the layout of display devices connected to the system if the hot plug event is a display device hot plug event, scanning through a file system of a storage device and notifying a user of the availability of that new storage device if the hot plug event is a storage device hot plug event, and/or other hot-plug event actions that would be apparent to one of skill in the art in possession of the present disclosure. Thus, at block 508, the peripheral device expansion card system 400 may enable hot plug event notification by the peripheral device expansion card system 400 to the computing system 200 without the use of a sideband cable, as is require in conventional THUNDERBOLT® peripheral device expansion card systems.

The method 500 then proceeds to optional block 510 where the card controller device remains powered while the peripheral device expansion card system is disconnected from the computing system in response to the activation of a power activation device that is located on the peripheral device expansion card system. In some embodiments, optional block 510 may be performed to cause at least some components in the peripheral device expansion card system 400 to remain powered when the peripheral device expansion card system 400 is disconnected from the computing system 200 (i.e., the card expansion bus connector 406 and the system expansion bus connector 208 are disconnected) in order to perform, for example, debugging operations (although other operations or reasons for powering the peripheral device expansion card system 400 in such a manner will fall within the scope of the present disclosure as well.) As such, one of skill in the art in possession of the present disclosure will recognize that optional block 510 may be performed during a manufacturing process of the peripheral device expansion card system 400 in which debugging or other testing operations are performed.

At optional block 510, the power activation device 410 may be activated. Activation of the power activation device 410 may be performed in a variety of manners, including activating a switch that is provided on the power activation device 410 and that is accessible on the card base 402 to cause auxiliary power (e.g., an on-card-base battery, a power source connected to an auxiliary power connection on the card base 402 and that is not part of the card expansion bus connector 406, etc.) to be connected to, available to, and/or otherwise utilized by the card controller device 404 such that it may operate when the peripheral device expansion card system 400 is not connected to the computing system 200. However, in other embodiments, the activation of the power activation device 410 may be software and/or instruction based to cause the auxiliary power to be connected to, available to, and/or otherwise utilized by the card controller device 404 such that it may operate when the peripheral device expansion card system 400 is not connected to the computing system 200. As such, following optional block 510, debugging, testing, and/or other operations may be performed on the powered (or at least partially powered) peripheral device expansion card system 400 that is not connected to the computing system 200. Thus, at optional block 510, the peripheral device expansion card system 400 may utilize an auxiliary power source while disconnected from the computing system without the need to activate such functionality via the use of a sideband cable, as is require in conventional THUNDERBOLT® peripheral device expansion card systems.

Thus, systems and methods have been described that provide peripheral device expansion card systems in computing systems without the need to use a sideband cable that has been traditionally required for those peripheral device expansion card systems. As such, THUNDERBOLT® peripheral device expansion card systems may be connected to a computing system using only a PCIe connector and without the need for a sideband cable that has previously been required with conventional THUNDERBOLT® peripheral device expansion cards, with a power activation device activated to cause the THUNDERBOLT® peripheral expansion card system to utilize auxiliary power to remain powered even when disconnected from the computing system (e.g., for debugging purposes), a system power reporting device that receives a power from power pin(s) on the PCIe connector being used by the THUNDERBOLT® chipset to determine an S5 powered off power state of the computing system, and an interrupt signal transmitted over a previously reserved pin on the PCIe connector to identify hot plug events to the computing system. As such, THUNDERBOLT® peripheral device hardware interfaces, as well as other types of expansion card technology, are enabled without the cost and complexity associated with the use of a sideband cable, and without the possibility of user error that can result from neglecting to connect the sideband cable or attempting to connect the sideband cable to an incompatible connector. Furthermore, the THUNDERBOLT® peripheral device expansion card systems described herein provide sideband functionality at all PCIe connectors in the computing system, thus increasing the number of THUNDERBOLT peripheral device expansion cards that may be connected to the computing system (e.g., from one in conventional computing systems, to as many as there are PCIe connectors in the computing system), thus increasing the number of peripheral devices that may be connected to those computing systems.

Figure 7:
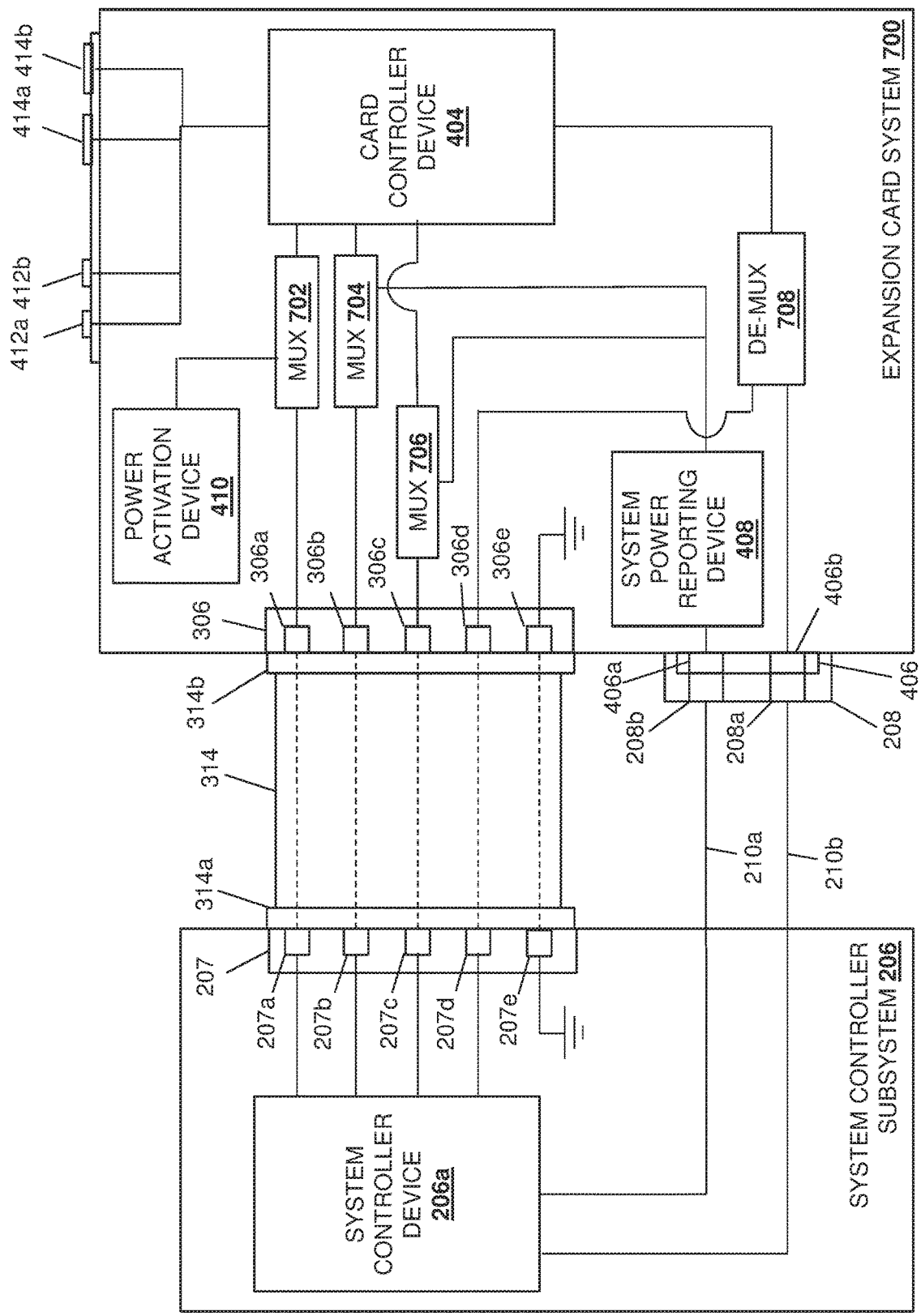
FIG. 7 is a schematic view illustrating an embodiment of a peripheral device expansion card system that enables the functionality the peripheral device expansion card system of FIG. 4 while providing support for the conventional peripheral device expansion card system of FIG. 3A.

With reference to FIG. 7, in some embodiments the functionality of the peripheral device expansion card system 400 discussed above may be provided while also providing support for computing systems that are configured to utilize the conventional peripheral device expansion card system 300 discussed above. In the illustrated embodiment, a peripheral device expansion card system 700 is provided that includes features of both the conventional peripheral device expansion card system 300 and the peripheral device expansion card system 400, discussed above, as well as multiplexers 702, 704, and 706, and de-multiplexer 708. However, while a specific embodiment is provided that utilizes multiplexers and de-multiplexers, one of skill in the art will recognize that other components may be utilized to provide similar dual-support functionality while remaining within the scope of the present disclosure.

In the illustrated example, the multiplexer 702 is provided between the power activation device 410 and the card controller device 404, as well as between the "force power"
pin 306a and the card controller device 404, and is configured to receive inputs that are sent through the "force power" pin 306a and/or received from the power activation device 410 and, in response, provide an output to the card controller device 404 that will cause at least some components in the peripheral device expansion card system 700 to remain powered when the peripheral device expansion card system 700 is disconnected from the computing system 200 (i.e., by disconnecting the card expansion bus connector 406 and the system expansion bus connector 208, and disconnecting the second sideband cable connector 314b on the sideband cable 314 from the card external connector 306 on the peripheral device expansion card system 700.) As such, functionality that causes at least some components in the peripheral device expansion card system 700 to remain powered when the peripheral device expansion card system 700 is disconnected from the computing system 200 is enabled by the peripheral device expansion card system 700 when used with computing systems that are only configured to be provided with conventional peripheral device expansion card systems using sideband cables (e.g., the conventional peripheral device expansion card system 300 discussed above), as well as when used with computing systems that are configured to be provided with peripheral device expansion card systems without the use of sideband cables (e.g., the peripheral device expansion card system 400 discussed above).

In the illustrated example, the multiplexer 704 is provided between the system power reporting device 408 and the card controller device 404, as well as between the "system S3" pin 306b and the card controller device 404, and is configured to receive inputs that are sent through the "system S3" pin 306b and/or received from the system power reporting device 408 and, in response, provide an output to the card controller device 404 that may be utilized by the card controller device 404 to determine the power state of the computing system 200. One of skill in the art in possession of the present disclosure will recognize that the example illustrated in FIG. 7 enables reporting of the S3 power sleep state when the peripheral device expansion card system 700 is used with computing systems that are only configured to be provided with conventional peripheral device expansion card systems using sideband cables, while not supporting such S3 power sleep state reporting when the peripheral device expansion card system 700 is used with computing systems that are configured to be provided with peripheral device expansion card systems without the use of sideband cables (e.g., the system power reporting device 408 would report that the computing system is in the S5 powered off state when receiving 0 volts of power through the power pin(s) 406a from the computing system 200 in the S3 power sleep state). However, such S3 power sleep state reporting may be enabled in the peripheral device expansion card system 700 by connecting the multiplexer 704 to the power sleep state signal pin (e.g., the previously reserved pin on the PCIe connector discussed above) while remaining within the scope of the present disclosure as well.

In the illustrated example, the multiplexer 706 is provided between the power activation device 410 and the card controller device 404, as well as between the "system S5" pin 306c and the card controller device 404, and is configured to receive inputs that are sent through the "system S5" pin 306c and/or received from the power activation device 410 and, in response, provide an output to the card controller device 404 that may be utilized by the card controller device 404 to determine the power state of the computing system 200. As such, functionality that allows the card controller device 404 to determine an S5 powered off power state of the computing system 200 is enabled by the peripheral device expansion card system 700 when used with computing systems that are only configured to be provided with conventional peripheral device expansion card systems using sideband cables, as well as when used with computing systems that are configured to be provided with peripheral device expansion card systems without the use of sideband cables.

In the illustrated example, the de-multiplexer 708 is provided between the interrupt signal pin 406b and the card controller device 404, as well as between the "hot plug event" pin 306d and the card controller device 404, and is configured to receive an input from the card controller device 404 and, in response, provide an output to the "hot plug event" pin 306d and the interrupt signal pin 406b that may be transmitted to the system controller device 206a to identify a hot plug event (e.g., the connection of a peripheral device to the peripheral device connectors 412a, 412b, 414a, and/or 414b.) As such, functionality that allows the card controller device 404 to signal a hot plug event to the computing system 200 is enabled by the peripheral device expansion card system 700 when used with computing systems that are only configured to be provided with conventional peripheral device expansion card systems using sideband cables, as well as when used with computing systems that are configured to be provided with peripheral device expansion card systems without the use of sideband cables.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An Information Handling System (IHS), comprising:
 a computing system that includes a system board having:
  a system controller device; and
  a system expansion bus connector that is located on the system board and that includes at least one power pin; and
 a peripheral device expansion card system that is coupled to the computing system through system expansion bus connector and that includes:
  a system power reporting device that is coupled to the at least one power pin and configured to:
   receive power from the computing system via the at least one power pin; and
   generate a power reporting signal from the power received via the at least one power pin; and
  a card controller device that is coupled to the system power reporting device, wherein the card controller device is configured to:
   identify the power reporting signal generated by the system power reporting device; and
   determine a power state of the computing system using the power reporting signal.

2. The IHS of claim 1, wherein the system power reporting device includes a voltage divider device that is configured to:
 receive the power that provides a first power amount through the at least one power pin; and
 provide the power reporting signal as a logical power reporting signal that indicates a second power amount that is less than the first power amount to the card controller device, and wherein the card controller device determines the power state of the computing system based on the second power amount.

3. The IHS of claim 1, wherein the power state determined for the computing system is a power off state.

4. The IHS of claim 3, wherein the system expansion bus connector includes a power sleep state signal pin that is coupled to the card controller device, and wherein the card controller device is configured to:
 receive a power sleep state signal via the power sleep state signal pin; and
 determine a power sleep state of the computing system using the power sleep state signal.

5. The IHS of claim 4, wherein the power sleep state signal pin is a reserved pin as defined by the Peripheral Component Interconnect express (PCIe) specification.

6. The IHS of claim 1, wherein the power state determined for the computing system is a fully operational power state.

7. A peripheral device expansion card system, comprising:
 a card base; and
 a card expansion bus connector that is located on the card base, that is configured to couple to a system board, and that includes:
  at least one power pin;
  a system power reporting device that is located on the card base, coupled to the at least one power pin, and configured to:
   receive power from a computing system via the at least one power pin; and
   generate a power reporting signal from the power received via the at least one power pin; and
  a card controller device that is coupled to the system power reporting device, wherein the card controller device is configured to:
   identify the power reporting signal generated by the system power reporting device; and
   determine a power state of the computing system using the power reporting signal.

8. The system of claim 7, wherein the system power reporting device includes a voltage divider device that is configured to:
 receive the power that provides a first power amount through the at least one power pin; and
 provide the power reporting signal as a logical power reporting signal that indicates a second power amount that is less than the first power amount to the card controller device, and wherein the card controller device determines the power state of the computing system based on the second power amount.

9. The system of claim 7, wherein the power state determined for the computing system is a power off state.

10. The system of claim 9, wherein the card expansion bus connector includes a power sleep state signal pin that is coupled to the card controller device, and wherein the card controller device is configured to:
 receive a power sleep state signal via the power sleep state signal pin; and
 determine a power sleep state of the computing system using the power sleep state signal.

11. The system of claim 10, wherein the power sleep state signal pin is a reserved pin as defined by the Peripheral Component Interconnect express (PCIe) specification.

12. The system of claim 7, wherein the power state determined for the computing system is a fully operational power state.

13. The system of claim 7, further comprising:
a multiplexer that is located on the card base and coupled between the system power reporting device and the card controller device, wherein the multiplexer is configured to receive a first multiplexer input from the system power reporting device and, in response, provide a first multiplexer output to the card controller device for use in determining the power state of the computing system;
a sideband cable connector located on the card base; and
a power state pin that is located on the sideband cable connector and that is coupled to the multiplexer, wherein the multiplexer is configured to receive a second multiplexer input from the power state pin and provide the first multiplexer output to the card controller device for use in determining the power state of the computing system.

14. A method for determining a computing system power state in a peripheral device expansion card system, comprising:
receiving, by a system power reporting device that is located on a peripheral device expansion card system and coupled through at least one power connection to a computing system, power from the computing system via the at least one power connection;
generating, by the system power reporting device using the power received via the at least one power connection, a power reporting signal;
identifying, by a card controller device that is located on the peripheral device expansion card system, the power reporting signal generated by the system power reporting device; and
determining, by the card controller device using the power reporting signal, a power state of the computing system.

15. The method of claim 14, further comprising:
receiving, by a voltage divider device included in the system power reporting device, the power that provides a first power amount through the at least one power connection; and
providing, by the voltage divider device, the power reporting signal as a logical power reporting signal that indicates a second power amount that is less than the first power amount to the card controller device, wherein the card controller device determines the power state of the computing system based on the second power amount.

16. The method of claim 14, wherein the power state determined for the computing system is a power off state.

17. The method of claim 16, further comprising:
receiving, by the card controller device via a power sleep state signal connection to the computing system, a power sleep state signal via the power sleep state signal connection; and
determining, by the card controller device using the power sleep state signal, a power sleep state of the computing system.

18. The method of claim 17, wherein the power sleep state signal connection includes a reserved pin as defined by the Peripheral Component Interconnect express (PCIe) specification.

19. The method of claim 14, wherein the power state determined for the computing system is a fully operational power state.

20. The method of claim 14, further comprising:
receiving, by a multiplexer that is located on the peripheral device expansion card system and coupled between the system power reporting device and the card controller device, a first multiplexer input from the system power reporting device and, in response, providing a first multiplexer output to the card controller device for use in determining the power state of the computing system; and
receiving, by the multiplexer from a power state connection that is provided by a sideband cable connector that is included on the peripheral device expansion card system, a second multiplexer input from the power state connection and, in response, providing the first multiplexer output to the card controller device for use in determining the power state of the computing system.

* * * * *